US006465581B1

(12) United States Patent
Wideman et al.

(10) Patent No.: US 6,465,581 B1
(45) Date of Patent: Oct. 15, 2002

(54) SILICA REINFORCED RUBBER COMPOSITION WHICH CONTAINS STABILIZED UNSYMMETRICAL COUPLING AGENTS AND ARTICLE OF MANUFACTURE, INCLUDING A TIRE, HAVING AT LEAST ONE COMPONENT COMPRISED OF SUCH RUBBER COMPOSITION

(75) Inventors: Lawson Gibson Wideman, Hudson, OH (US); Paul Harry Sandstrom, Tallmadge, OH (US); Theodore Lamson Folk, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 130 days.

(21) Appl. No.: 09/768,299

(22) Filed: Jan. 24, 2001

(51) Int. Cl.$^7$ ................................. C08L 5/544
(52) U.S. Cl. ................ 525/332.7; 525/332.6; 525/188; 525/219; 525/225; 525/226; 524/94; 524/261; 524/263; 524/265; 524/267; 152/209.1
(58) Field of Search ............... 524/332.7, 332.6, 524/186

(56) References Cited

U.S. PATENT DOCUMENTS

| 5,094,829 | A |   | 3/1992  | Krivak et al. ............. 423/339 |
|-----------|---|---|---------|------------------------------------|
| 5,319,047 | A | * | 6/1994  | Wideman et al. .......... 526/304   |
| 5,328,963 | A | * | 7/1994  | Muse et al. ................ 525/282 |
| 5,675,014 | A | * | 10/1997 | Cohen et al. .............. 548/110  |
| 5,679,728 | A |   | 10/1997 | Kawazura et al. ......... 523/215   |
| 5,696,188 | A | * | 12/1997 | D'Sidocky et al. ........ 524/219   |
| 5,698,619 | A | * | 12/1997 | Cohen et al. .............. 524/188  |
| 5,698,620 | A | * | 12/1997 | Wideman et al. .......... 524/270   |
| 5,708,069 | A |   | 1/1998  | Burns et al. ............... 524/403 |
| 5,750,610 | A |   | 5/1998  | Burns et al. ............... 524/434 |
| 5,760,110 | A | * | 6/1998  | Zimmer et al. ............ 524/83    |
| 5,789,514 | A |   | 8/1998  | Burns et al. ............... 528/12  |
| 5,859,115 | A |   | 1/1999  | Rennar ...................... 524/492 |
| 5,981,637 | A | * | 11/1999 | Blok et al. ................. 524/219 |
| 6,022,923 | A | * | 2/2000  | Araki et al. ............... 524/494 |
| 6,028,137 | A |   | 2/2000  | Mahmud et al. ........... 524/496   |
| 6,084,014 | A | * | 7/2000  | Materne et al. ........... 524/188  |
| 6,218,561 | B1 | * | 4/2001 | Wideman et al. .......... 556/427   |
| 6,297,325 | B1 | * | 10/2001 | Wideman et al. ......... 525/282    |
| 6,410,625 | B1 | * | 6/2002  | Materne et al. ........... 524/262  |

FOREIGN PATENT DOCUMENTS

| EP | 0721971       |   | 7/1996 | ............. C08K/9/06  |
|----|---------------|---|--------|-------------------------|
| EP | 0 721 971 A1  | * | 7/1996 | ............. C08K/9/06  |
| EP | 0816420       |   | 1/1998 | ............. C08K/5/54  |
| WO | 0149781       |   | 7/2001 | ........... C08K/5/5425  |

OTHER PUBLICATIONS

European Search Report.

* cited by examiner

Primary Examiner—David W. Wu
Assistant Examiner—Rip A Lee
(74) Attorney, Agent, or Firm—Henry C. Young, Jr.

(57) ABSTRACT

This invention relates to use of stabilized unsymmetrical coupling agents for use in conjugated diene-based rubber compositions reinforced with silica-based reinforcement, namely use of stabilized 2-benzothiazyl-3-(triethoxysilylpropyl) disulfide and 3-(triethoxysilyl)propyl-N-maleamic acid. Said stabilized unsymmetrical coupling agent materials may be provided for mixing with said diene-based rubber(s), for example, as individual materials, as at least one of said materials being pre-reacted with aggregates of precipitated silica, said precipitated silica having hydroxyl groups (e.g. silanol groups) on its surface. The invention includes an article of manufacture, including a tire, having at least one component comprised of such rubber composition.

20 Claims, No Drawings

SILICA REINFORCED RUBBER COMPOSITION WHICH CONTAINS STABILIZED UNSYMMETRICAL COUPLING AGENTS AND ARTICLE OF MANUFACTURE, INCLUDING A TIRE, HAVING AT LEAST ONE COMPONENT COMPRISED OF SUCH RUBBER COMPOSITION

FIELD OF THE INVENTION

This invention relates to use of stabilized unsymmetrical coupling agents for use in conjugated diene-based rubber compositions reinforced with silica-based reinforcement, namely use of stabilized 2-benzothiazyl-3-(triethoxysilylpropyl) disulfide and 3-(triethoxysilyl)propyl-N-maleamic acid. Said stabilized unsymmetrical coupling agent materials may be provided for mixing with said diene-based rubber(s), for example, as individual materials, as at least one of said materials being pre-reacted with aggregates of precipitated silica, said precipitated silica having hydroxyl groups (e.g. silanol groups) on its surface. The invention includes an article of manufacture, including a tire, having at least one component comprised of such rubber composition.

BACKGROUND OF THE INVENTION

For various applications utilizing rubber compositions, carbon black and/or synthetic amorphous silica-based materials are conventionally used as particulate reinforcing fillers for the elastomer(s) of the rubber composition(s).

Often a coupling agent is used together with the silica in order to couple, or otherwise enhance, its elastomer reinforcement effect for the elastomer(s) and such use of a coupling agent is well known to those having skill in such art.

Historically, such coupling agents are composed, for example, of one moiety (e.g. a silane-based moiety such as, for example, an alkoxysilane moiety) which is reactive with hydroxyl groups (e.g. silanol groups) on the surface of a synthetic amorphous silica and another moiety (e.g. a polysulfide bridge) which becomes interactive with a conjugated diene-based elastomer. Typically, such coupling agents are symmetrical compounds.

For example, bis-(3-trialkoxysilylpropyl) polysulfides having an average of from 2 to 4 connecting sulfur atoms in their polysulfidic bridge are often used as coupling agents to enhance coupling of synthetic amorphous silicas, such as for example, aggregates of precipitated silica, to various conjugated diene-based elastomers. Use of such symmetrical coupling agents is well known to those having skill in such art.

However, use of unsymmetrical coupling agents can represent problems not normally encountered by use of the aforesaid symmetrical coupling agents.

For example, various unsymmetrical coupling agents may tend to pre-react with themselves before mixing with a blend of an elastomer and precipitated silica, with their intended use of a coupling agent being seriously impaired if not altogether nullified by the relative short shelf life of the unsymmetrical coupling agents.

Exemplary of unsymmetrical coupling agents contemplated herein are 2-benzothiazyl-3-(triethoxysilylpropyl) disulfide and 3-(triethoxysilyl)propyl-N-maleamic acid. Such unsymmetrical coupling agents have a relatively short shelf life since they inherently tend to react with themselves or with each other if used in combination and therefore have a limited use, in practice, as coupling agents for manufacturing products on an industrial scale.

For example, 2-benzothiazyl-3-(triethoxysilylpropyl) disulfide can proceed to react with itself and form 2-mercaptobenzothiozole and symmetrical disulfides, thereby severely limiting its use as a silica coupling agent.

For example, 3-(triethoxysilyl)propyl-N-maleamic acid can proceed to react with itself to liberate ethanol and form an insoluble polymeric siloxane network, thereby severely limiting its use as a silica coupling agent.

In the description of this invention, the term "phr" is used to designate parts by weight of a material per 100 parts by weight of elastomer. In the further description, the terms "rubber" and "elastomer" may be used interchangeably unless otherwise mentioned. The terms "vulcanized" and "cured" may be used interchangeably, as well as "unvulcanized" or "uncured", unless otherwise indicated.

SUMMARY AND PRACTICE OF THE INVENTION

In accordance with one aspect of this invention, a rubber composition is provided which comprises (A) 100 parts by weight of at least one diene hydrocarbon based elastomer, (B) about 25 to about 100, optionally about 35 to about 90, phr of particulate reinforcing filler comprised of about 25 to about 100, alternately about 35 to about 90, phr of synthetic amorphous silica aggregates and, correspondingly, from zero to about 75, alternately about 10 to about 65, phr of at least one of carbon black and silica treated carbon black having domains of silica on its surface, wherein said silica aggregates and said silica domains on the surface of said treated carbon black contain hydroxyl groups (e.g. silanol groups) on their surface; and (C) about 1 to about 100, alternately about 8 to about 15, phr of a pre-treated silica as aggregates of precipitated silica which contain hydroxyl groups (e.g. silanol groups) on their surface which have been reacted with:

(1) 2-benzothiazyl-3-(triethoxysilylpropyl) disulfide, or (2) 3-(triethoxysilyl)propyl-N-maleamic acid.

A significant aspect of this invention is the use of a composite of a pre-treated silica by reaction with the 2-benzothiazyl-3-(triethoxysilylpropyl) disulfide or 3-(triethoxysilyl)propyl-N-maleamic acid.

For example, by reaction of the triethoxysilylpropyl moiety of the 2-benzothiazyl-3-(triethoxysilylpropyl) disulfide with the hydroxyl groups of the precipitated silica, its degradation and associated formation of 2-mercaptobenzothiazole and symmetrical disulfides is substantially retarded and the resulting composite of pre-treated silica is readily available for use as a coupling agent for coupling precipitated silica to a diene-based elastomer.

For example, by reaction of the triethoxysilyl moiety of the 3-(triethoxysilyl)propyl-N-maleamic acid with the hydroxyl groups of the precipitated silica, its degradation and associated formation of insoluble polymeric siloxane network is substantially retarded and the resulting composite of pre-treated silica is readily available for use as a coupling agent for coupling precipitated silica to a diene-based elastomer.

In practice, the said composite of pre-treated silica is preferably comprised of about 1 to about 20 percent by weight by weight of the precipitated silica and, correspondingly, about 5 to about 15 weight percent derived from reaction of said 2-benzothiazyl-3-(triethoxysilylpropyl) disulfide or 3-(triethoxysilyl)propyl-N-maleamic acid.

In further accordance with this invention, an article of manufacture is provided which contains at least one component comprised of the rubber composition of this invention.

In additional accordance with this invention, a tire is provided which contains at least one component comprised of the rubber composition of this invention.

In further accordance with this invention, a tire is provided having a tread comprised of the rubber composition of this invention.

It is to be appreciated that additional coupling agents may be used in the practice of this invention to aid in coupling the silica to elastomer(s). Such coupling agents would conventionally have a moiety reactive with hydroxyl groups on the silica (e.g. silanol groups) and another moiety interactive with one or more elastomers. Use of such coupling agents for such purpose is well known to those having skill in such art.

For example, a coupling agent as a bis-(3-trialkoxysilylalkyl) polysulfide having from 2 to 8, with an average of from 2 to 2.6 or from 3.5 to 4, connecting sulfur atoms in its polysulfidic bridge might be used.

Representative of such coupling agent is bis-(3-triethoxysilylpropyl) polysulfide having from 2 to 8, with an average of from 2 to 2.6 or from 3.5 to 4, connecting sulfur atoms in its polysulfidic bridge.

The aggregates of precipitated silica is intended to include precipitated aluminosilicates as a co-precipitated silica with a minor amount of aluminum.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate, which can contain, if desired, a minor amount of aluminum salt. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The carbon black with domains of exposed silica on its surface may be, for example, carbon black prepared by treatment of carbon black by reaction of an alkyl silane (e.g. an alkoxy silane) with carbon black or by co-fuming carbon black and silica at an elevated temperature. For example, see U.S. Pat. Nos. 5,679,728 and 6,028,137.

The 2-benzothiazyl-3-(triethoxysilylpropyl) disulfide or 3-(triethoxysilyl)propyl-N-maleamic acid may be reacted with aggregates of precipitated silica which contain hydroxyl groups on their surface to form composites thereof by, for example, by dissolving the material in a volatile organic solvent such as, for example acetone, and adding the solvent solution to the particulate silica then removing the solvent.

It is envisioned herein that the resulting composite can be mixed with a suitable diene-based elastomer and the silica coupled to the elastomer by interaction in situ within the elastomer host of the mercaptopropyl radical or maleamic acid/maleimide moiety component of the composite, as the case may be.

By the practice of this invention, such in situ reaction within the elastomer host is accomplished without an appreciable, and preferably in the absence of, evolution of an alcohol. Indeed, by the inherent chemistry of the pre-treatment of the precipitated silica prior to addition to the elastomer, any evolution of alcohol as a result of reaction of the hydroxyl groups on the surface of the silica occurs prior to addition of the pre-treated silica to the mixing with the elastomer host.

In another aspect of the invention, the precipitated silica is pre-hydrophobated, at least to some extent, in the following manner, albeit in a low level as to not interfere with the trialkoxy silane reaction of the unsymmetrical coupler with the silica surface.

Thus, the precipitated silica is pre-hydrophobated prior or subsequent to its addition to the unsymmetrical coupler before introduction to the elastomer. This is considered herein to be important as to both the process of mixing and reacting of the mercapto/maleamic acid, as the case may be, moiety of the unsymmetrical coupler.

In particular, it is considered herein that pre- or post-hydrophobation of the silica material, particularly with an alkylalkoxy or halosilane, as the case may be, enables a more efficient mixing, or processing, of it within the elastomer host in that such pre-hydrophobation of the silica material (A) renders it more compatible with the diene-based elastomer and (B) substantially reduces a tendency for a precipitated silica to re-agglomerate with itself within the elastomer host.

Moreover, the accompanying in situ reaction of the mercapto or maleamic acid/maleamide moiety of the unsymmetrical coupler now enables both the more efficient mixing coupled with the associated reaction with only a minimal evolution of an alcohol, preferably no evolution of alcohol from the rubber composition.

For some applications, it might be desirable to use a pre-hydrophobated silica which might be beneficial because a pre-hydrophobated silica renders such silica more compatible with the diene-based elastomer and substantially reduces a tendency for a precipitated silica to re-agglomerate with itself within the elastomer host.

Moreover, use of the silica material having been pre-treated with both the unsymmetrical coupler and a hydrophobating agent might be desirable in order to enable both the more efficient mixing of the silica material with the associated diene-based elastomer(s) coupled with the associated reaction of the pre-treated silica of this invention within the elastomer host with only a minimal evolution of an alcohol, preferably no evolution of alcohol from the rubber composition.

The hydrophobated precipitated silica aggregates might be recovered, for example, from treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the *Encyclopedia of Chemical Technology,* Fourth Edition (1997), Volume 21, Kirk-Othmer in Pages 1020 through 1026 and U.S. Pat. No. 5,094,829 as well as U.S. Pat. Nos. 5,708,069, 5,789,514 and 5,750,610 for a more detailed discussion.

Such pre-hydrophobated silica (a hydrophobation of the silica before mixing it with the diene-based elastomers) may be prepared by reacting the silica (e.g. aggregates of a precipitated silica) with an alkylsilane of the general Formula (III), and optionally an organomercaptosilane of the general formula (IV), with (A) said aggregates of synthetic precipitated silica or (B) an aqueous dispersion of colloidal silica particles from which a precipitated silica is recovered to form a silica composite thereof;

wherein said alkylsilane of the general Formula (III) is represented by

$$X_n\text{—Si—}R_{4-n} \tag{III}$$

wherein R is an alkyl radical having from one to 18 carbon atoms, n is a value of from 1 to 3 and X is a radical selected from chlorine or bromine or alkoxy radical as $(OR^1)$—, wherein $R^1$ is an alkyl radical selected from methyl and ethyl radicals, and where said organomercaptosilane is of the general formula (IV):

$$(X)_n(R^2O)_{3-n}\text{—Si—}R^3\text{—SH} \tag{IV}$$

wherein X is a radical selected from chlorine, bromine, and alkyl radicals having from one to 16 carbon atoms; wherein $R^2$ is an alkyl radical having from one to 16 carbon atoms and $R^3$ is an alkylene radical having from one to 16 carbon atoms; and n is a value from zero to 3.

Representative alkylsilanes of Formula (III) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

In practice, various diene-based elastomers may be used such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprenelbutadiene copolymers, styrenelisoprene copolymers, polybutadiene and styrene/isoprene/butadiene terpolymers.

In the further practice of this invention, particulate reinforcement for the rubber composition may be particulate synthetic amorphous silica, or a combination of carbon black and amorphous silica (exclusive of silica treated carbon black), usually of an amount in a range of about 35 to about 100 alternately about 35 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used. Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica aggregates preferably employed in this invention are precipitated silicas such as, for example, those obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society,* Volume 60, Page 304 (1930).

The silica may also be typically characterized by having a dibutylphthalate (DBP) absorption value in a range of about 50 to about 400 cm3/100 g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization a non-silane containing coupling agent for enhancing reinforcement of a conjugated diene-based elastomer with a particulate synthetic amorphous silica material which contains hydroxyl groups (e.g. silanol groups) on its surface.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE I

Preparation of Silica Treated with 2-benzothiazyl-3-(triethoxysilyl)propyl Disulfide Preparation of the above treated silica is prepared and referred to herein as a silica pre-treated "Coupler Composite A".

A four liter, open-top, glass reactor was charged with 15.0 g (0.063 mole) of 3-mercaptopropyltriethoxysilane in 300 ml of chloroform and 18.4 g (0.063 mole plus 10%) of 2,2'-mercaptobenzothiazyl disulfide in 300 ml of chloroform.

The reaction mixture was stirred for about one hour under a nitrogen atmosphere and then allowed to stand under a nitrogen atmosphere at room temperature (e.g. 23° C.) overnight (about 16 hours). The resulting mixture was filtered to remove any 2-mercaptobenzothiazole, as a precipitate, which may have formed and an aliquot was taken for immediate Mass Spectrometry analysis, where a preponderance of the unsymmetrical 2-benzothiazole-3-(triethoxysilyl)propyl disulfide was found.

The remaining filtrate (approximately 600 ml of solution) was treated by blending it, via stirring, with 234 grams of Rhoda Zeosil 1165MP precipitated silica. The solvent was then removed under a reduced pressure at room temperature (e.g. 23° C.) to yield 260 g of white, silica-like granules having a weight ratio of unsymmetrical coupling agent to silica of about 1/10 as Coupler Composite A.

EXAMPLE II

Preparation of Silica Treated with 3-(triethoxysilyl)propyl-N-maleamic Acid

Preparation of the above treated silica is prepared and referred to herein as a silica pre-treated "Coupler Composite B". A four liter, open-top, glass reactor was charged with 6.7 g (0.068 mole) of maleic anhydride dissolved in 420 ml of reagent acetone and 15.0 g (0.068 mole) of 3-aminopropyltriethoxysilane, with stirring, under nitrogen atmosphere while experiencing a mild exotherm.

The reaction mixture was stirred under a nitrogen atmosphere for about one hour and then allowed to stand under nitrogen atmosphere at room temperature (e.g.23° C.) over night for about 16 hours. An aliquot was taken for immediate Mass Spectrometry analysis, where a preponderance of the unsymmetrical 3-(triethoxysilyl)propyl-N-maleamic acid was found.

Additional reagent acetone was added in an amount of 620 ml and the solution treated by blending it, via stirring, with 217 grams of Rhoda Zeosil 1165MP precipitated silica. The solvent was then removed under a reduced pressure at room temperature (e.g. 23° C.) to yield 225 g of white, silica-like granules having a weight ratio of unsymmetrical coupling agent to silica of about 1/10 as Coupler Composite B.

EXAMPLE III

Rubber compositions comprised of 100 phr of natural rubber and solution SBR (styrene/butadiene copolymer rubber) with 43 phr of carbon black and 17 phr of precipitated silica as reinforcement pigments.

Control Sample A used a composite of bis-(triethoxysilylpropyl) tetrasulfide on carbon black in a 50/50 weight ratio as a silica coupler. Sample B used Coupler Composite A of Example I as a silica coupler which had been stored for about one year in a closed container at room temperature (e.g. 23° C.). Sample C used Coupler Composite B of Example I as a silica coupler which had been stored for about one year in a closed container at room temperature (e.g. 23° C.).

The formulations for Control Sample A, Sample B and Sample C were adjusted to provide similar or same 300/100 percent moduli ratio as for Control Sample A in order to provide a basis for comparison coupling properties.

The formulations are shown in the following Table 1.

The first non-productive mixing step was conducted for about 4 minutes to a temperature of about 160° C. The final productive mixing step was conducted for about 2 minutes to a final temperature of about 110° C.

TABLE 1

| Material | Control Sample A | Sample B | Sample C |
|---|---|---|---|
| Non-productive Mixing Step 1 | | | |
| Natural rubber[1] | 50 | 50 | 50 |
| Styrene/butadiene rubber[2] | 50 | 50 | 50 |
| Carbon black[3] | 43 | 43 | 43 |
| Processing oil[4] | 5.8 | 5.8 | 5.8 |
| Antioxidant/antiozonant[5] | 3.3 | 3.3 | 3.3 |
| Stearic acid | 2 | 2 | 2 |
| Zinc oxide | 2.5 | 2.5 | 2.5 |
| Non-productive Mixing Step 2 | | | |
| Silica[6] | 17 | 0 | 0 |
| Processing oil[4] | 3 | 3 | 3 |
| Silane coupler (50% active)[7] | 3.5 | 0 | 0 |
| Coupler Composite A (10% active)[8] | 0 | 18.7 | 0 |
| Coupler Composite B (10% active)[9] | 0 | 0 | 18.7 |
| Productive Mixing Step | | | |
| Sulfur | 1.3 | 1.3 | 1.3 |
| Accelerator(s)[10] | 1.1 | 1.1 | 1.1 |

[1]Natural rubber
[2]Styrene/butadiene rubber obtained as SLF1216 from The Goodyear Tire & Rubber Company
[3]ASTM N299 carbon black
[4]Naphthenic/parrafinic rubber processing oil
[5]P-phenylenediamine type
[6]Obtained as Hi-Sil ® 210 from PPG Industries
[7]Composite of bis(3-triethoxysilylpropyl) tetrasulfide and carbon black in a 50/50 weight ratio as X266S from Degussa
[8]Product of Example 1, said 2-benzothiazyl-3-(triethoxysilyl)propyl disulfide and precipitated silica on a 1/10 weight basis
[9]Product of Example 2, said 3-(triethoxysilyl)propyl-N-maleamic acid and precipitated silica on a 1/10 weight basis
[10]Sulfenamide type Various physical properties of the Samples of Table 1 were evaluated and reported in the following Table 2.

TABLE 2

| | Parts | | |
|---|---|---|---|
| Properties | Sample A Control | Sample B | Sample C |
| Modulus/Tensile/Elongation | | | |
| 100%, MPa | 1.7 | 2.1 | 2.2 |
| 300%, MPa | 9 | 12.3 | 11.6 |
| 300/100 modulus ratio | 5.4 | 5.8 | 5.4 |
| Ult tensile strength (MPa) | 17.1 | 19 | 18.8 |
| Ult elongation (%) | 475 | 439 | 457 |
| Hardness (Shore A) | | | |
| 23° C. | 61 | 64 | 66 |
| 100° C. | 52 | 56 | 58 |
| Rebound, % | | | |
| 23° C. | 48 | 49 | 47 |
| 100° C. | 61 | 64 | 61 |
| Tear Resistance, N | 80 | 76 | 73 |
| DIN Abrasion (cc loss) | 88 | 118 | 92 |
| Dynamic Stiffness | | | |
| 0° C. | | | |
| E' | 18.3 | 20.3 | 23.1 |
| Tan delta | 0.170 | 0.175 | 0.159 |
| 60° C. | | | |
| E' | 6.9 | 8.8 | 10 |
| Tan delta | 0.092 | 0.091 | 0.096 |

The results, as reported in Table 2, clearly show that the state of cure of Sample B and Sample C, namely the unsymmetrical coupling agent composites, illustrated good coupling properties. In particular, the 300 percent modulus, E' dynamic stiffness, rebound, Tan delta at 60° C. and 300/100 modulus ratio values illustrated good coupling properties for Sample B and for Sample C as compared to Control Sample A.

This is considered as being significant because the maintained or increased 300 percent modulus and E' stiffness values are predictive of improved durability for a tire tread of a rubber composition such as Sample B or Sample C, while maintaining rebound and Tan delta at 60° C. values are predictive of cooler running tire treads with lower rolling resistance for tire treads with Sample B or Sample C rubber compositions as compared to Control Sample A.

While various embodiments are disclosed herein for practicing the invention, it will be apparent to those skilled in this art that various changes and modifications may be made therein without departing from the spirit or scope of the invention.

What is claimed is:

1. A rubber composition which comprises
   (A) 100 parts by weight of at least one diene-based elastomer,
   (B) about 25 to about 100 phr of particulate reinforcing filler comprised of about 25 to about 100 phr of synthetic amorphous silica aggregates and, correspondingly, from zero to about 75 phr of at least one of carbon black and silica treated carbon black having domains of silica on its surface, wherein said silica aggregates and said silica domains on the surface of said treated carbon black contain hydroxyl groups on their surface; and
   (C) about 1 to about 100 phr of a pre-treated silica as aggregates of precipitated silica which contain hydroxyl groups on their surface which have been reacted with:
      (1) 2-benzothiazyl-3-(triethoxysilylpropyl) disulfide, or
      (2) 3-(triethoxysilyl)propyl-N-maleamic acid.

2. The rubber composition of claim 1 which contains a coupling agent as a bis-(3-triethoxysilylpropyl) polysulfide having from 2 to 8, with an average of from 2 to 2.6 or from 3.5 to 4, connecting sulfur atoms in its polysulfidic bridge.

3. The rubber composition of claim 1 wherein said synthetic amorphous silica aggregates are pre reacted with an alkylsilane of the general Formula (III) and optionally with an organomercaptosilane of the general Formula (IV)

$$X_n\text{—Si—}R_{4-n} \qquad (III)$$

wherein R is an alkyl radical having from one to 18 carbon atoms, n is a value of from 1 to 3 and X is a radical selected from chlorine or bromine or alkoxy radical as $(OR^1)$—, wherein $R^1$ is an alkyl radical selected from methyl and ethyl radicals, and where said organomercaptosilane is of the general formula (IV):

$$(X)_n(R^2O)_{3-n}\text{—Si—}R^3\text{—SH} \qquad (IV)$$

wherein X is a radical selected from chlorine, bromine, and alkyl radicals having from one to 16 carbon atoms; wherein $R^2$ is an alkyl radical having from one to 16 carbon atoms and $R^3$ is an alkylene radical having from one to 16 carbon atoms; and n is a value from zero to 3.

4. The rubber composition of claim 3 wherein synthetic amorphous silica aggregates are pre reacted with an alkylsilane of the general Formula (III) selected from at least one of trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

5. The rubber composition of claim 1 wherein said particulate reinforcing filler is synthetic amorphous silica aggregates.

6. The rubber composition of claim 1 wherein said particulate reinforcing filler is synthetic amorphous silica aggregates and carbon black.

7. The rubber composition of claim 1 wherein said particulate reinforcing filler is from about 35 to about 90 phr of synthetic amorphous silica aggregates and from about 10 to about 65 phr of carbon black.

8. The rubber composition of claim 1 wherein said pre-treated silica is aggregates of precipitated silica which have been reacted with 2-benzothiazyl-3-(triethoxysilylpropyl) disulfide.

9. The rubber composition of claim 5 wherein said pre-treated silica is aggregates of precipitated silica which have been reacted with 2-benzothiazyl-3-(triethoxysilylpropyl) disulfide.

10. The rubber composition of claim 6 wherein said pre-treated silica is aggregates of precipitated silica which have been reacted with 2-benzothiazyl-3-(triethoxysilylpropyl) disulfide.

11. The rubber composition of claim 1 wherein said pre-treated silica is aggregates of precipitated silica which have been reacted with 3-(triethoxysilyl)propyl-N-maleamic acid.

12. The rubber composition of claim 5 wherein said pre-treated silica is aggregates of precipitated silica which have been reacted with 3-(triethoxysilyl)propyl-N-maleamic acid.

13. The rubber composition of claim 6 wherein said pre-treated silica is aggregates of precipitated silica which have been reacted with 3-(triethoxysilyl)propyl-N-maleamic acid.

14. The rubber composition of claim 1 wherein said diene-based elastomer(s) is selected from homopolymers and copolymers of monomers selected from isoprene and 1,3-butadiene and copolymers of styrene and at least one diene selected from isoprene and 1,3-butadiene.

15. The rubber composition of claim 1 wherein said diene-based elastomer(s) is comprised of at least one of natural and/or synthetic cis 1,4-polyisoprene, cis 1,4-polybutadiene, styrene/butadiene copolymers prepared by aqueous emulsion polymerization prepared or by organic solvent solution polymerization, medium vinyl polybutadiene having a vinyl 1,2-content in a range of about 15 to about 90 percent, isoprene/butadiene copolymers, styrene/isoprene/butadiene terpolymers and tin coupled elastomers selected from at least one of tin coupled organic solution prepared styrene/butadiene co-polymers, isoprene/butadiene copolymers, styrene/isoprene copolymers, polybutadiene and styrene/isoprene/butadiene terpolymers.

16. An article of manufacture which contains at least one component comprised of the rubber composition of claim 1.

17. A tire which contains at least one component comprised of the rubber composition of claim 1.

18. A tire having a tread comprised of the rubber composition of claim 1.

19. A tire having a tread comprised of the rubber composition of claim 8.

20. A tire having a tread comprised of the rubber composition of claim 11.

* * * * *